(12) United States Patent
Wang

(10) Patent No.: US 10,590,285 B2
(45) Date of Patent: Mar. 17, 2020

(54) OMNIPHOBIC COATING

(71) Applicants: Honeywell International Inc., Morris Plains, NJ (US); Marilyn Wang, Shanghai (CN)

(72) Inventor: Marilyn Wang, Shanghai (CN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 150 days.

(21) Appl. No.: 15/531,293

(22) PCT Filed: Nov. 27, 2014

(86) PCT No.: PCT/CN2014/092376
§ 371 (c)(1),
(2) Date: May 26, 2017

(87) PCT Pub. No.: WO2016/082153
PCT Pub. Date: Jun. 2, 2016

(65) Prior Publication Data
US 2017/0342276 A1 Nov. 30, 2017

(51) Int. Cl.
*B05D 1/00* (2006.01)
*B05D 5/08* (2006.01)
(Continued)

(52) U.S. Cl.
CPC ............ *C09D 5/1668* (2013.01); *B05D 1/62* (2013.01); *B05D 3/007* (2013.01); *B05D 3/142* (2013.01); *B05D 5/083* (2013.01); *B29C 59/14* (2013.01); *C08J 7/123* (2013.01); *C08J 7/126* (2013.01); *C09D 133/12* (2013.01);
(Continued)

(58) Field of Classification Search
CPC ............ B05D 2451/00; B05D 2401/33; B05D 2401/40; B05D 1/62; B05D 3/007; B05D 3/142; B05D 5/083; B29C 59/14; C08J 7/123; C08J 7/126; C08K 3/36; C08K 9/06; C09D 133/12; C09D 5/1668
See application file for complete search history.

(56) References Cited

U.S. PATENT DOCUMENTS

| 7,407,710 B2 * | 8/2008 | Qiu | C08F 283/128 |
| | | | 428/447 |
| 2014/0147631 A1 * | 5/2014 | Yang | B05D 5/08 |
| | | | 428/143 |

FOREIGN PATENT DOCUMENTS

| CN | 1663693 A | 9/2005 |
| CN | 102179982 A | 9/2011 |

(Continued)

OTHER PUBLICATIONS

JP-2006022258-A, Jan. 2006, Machine translation.*
(Continued)

*Primary Examiner* — Satya B Sastri
(74) *Attorney, Agent, or Firm* — Alston & Bird LLP

(57) ABSTRACT

Methods for forming a coating can include preparing a nanocomposite film including surface modified silicon dioxide nanoparticles, applying an oxygen plasma treatment to the nanocomposite film to form a treated nanocomposite film, and applying a fluorosilane solution to the treated nanocomposite film to form the coating. A coating can include a nanocomposite film including surface modified silicon dioxide nanoparticles, the nanocomposite film having an oxygen plasma treated surface, and a monolayer of a fluoro alkyl chain.

3 Claims, 2 Drawing Sheets

Figure 1:
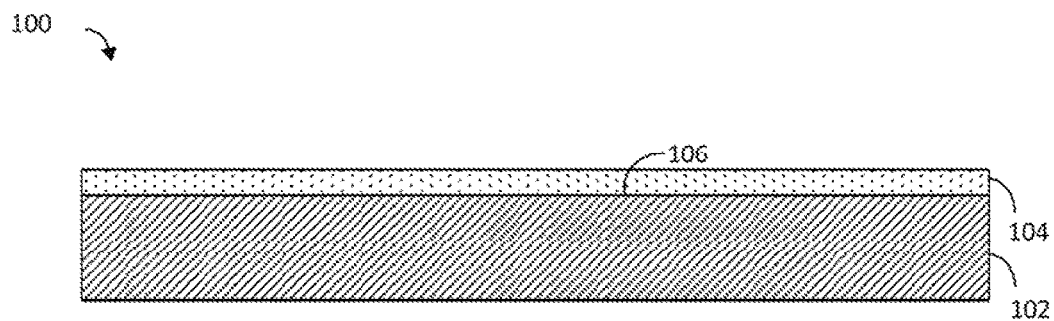

(51) Int. Cl.
  *C09D 133/12* (2006.01)
  *C08K 3/36* (2006.01)
  *C08K 9/06* (2006.01)
  *C09D 5/16* (2006.01)
  *B29C 59/14* (2006.01)
  *C08J 7/12* (2006.01)
  *B05D 3/00* (2006.01)
  *B05D 3/14* (2006.01)

(52) U.S. Cl.
  CPC ........... *B05D 2451/00* (2013.01); *C08K 3/36* (2013.01); *C08K 9/06* (2013.01)

(56) References Cited

FOREIGN PATENT DOCUMENTS

| CN | 103881419 A | | 6/2014 |
|---|---|---|---|
| CN | 103951277 A | | 7/2014 |
| EP | 0497189 A2 | | 8/1992 |
| EP | 2348757 A1 | | 7/2011 |
| JP | 2006022258 A | * | 1/2006 |
| WO | 2007/068760 A2 | | 6/2007 |
| WO | 2008/141981 A1 | | 11/2008 |
| WO | 20121138992 A2 | | 10/2012 |
| WO | 20141135353 A1 | | 9/2014 |
| WO | 20151139824 A1 | | 9/2015 |

OTHER PUBLICATIONS

"International Application Serial No. PCT/CN2014/092376, International Search Report dated Mar. 27, 2015", 5 pgs.

"International Application Serial No. PCT/CN2014/092376, Written Opinion dated Mar. 27, 2015", 5 pgs.

Erasmus, E., et al., "Superhydrophobic cotton by fluorosilane modification", *Indian Journal of Fibre & Textile Research*, vol. 34, (Dec. 2009), 377-379.

Kim, J. W., et al., "Size Control of Silica Nanoparticles and Their Surface Treatment for Fabrication of Dental Nanocornposites", *Biomacromolecules*, 8. (2007), 215-222.

Peutzfeldt, S., et al., "Characterization of resin composites polymerized with plasma arc curing units", *Dental Materials*, 16, (2000), 330-336.

Tuteja, Anish, et al., "Robust omniphobic surfaces", *Proc. Natl. Acad. Sci. USA*, 105(47), (2008), 18200-18205.

European Application Ser. No. 14906747.2, Search Report and Written Opinion, dated Aug 28, 2018, 10.

* cited by examiner

OMNIPHOBIC COATING

CLAIM OF PRIORITY

This application is a U.S. National Stage Filing under 35 U.S.C. 371 from International Application No. PCT/CN2014/092376, filed on Nov. 27, 2014, and published as WO 2016/082153 A1 on Jun. 2, 2016, which is hereby incorporated by reference herein in its entirety.

TECHNICAL FIELD

The present subject matter relates generally to coatings, such as water-repelling and oil-repelling coatings and methods for forming the coatings. More particularly, the present application relates to transparent nanocomposite coatings that have water-repelling and oil-repelling properties.

BACKGROUND

Transparent materials such as transparent polymeric materials can be used for a variety of products through which light is transmitted for viewing an image. The transparent material typically has a first surface and a second surface. One surface can be curved relative to the other to change the direction of light to the eye, such as in an ophthalmic lens of eyeglasses, or alternatively, the surfaces can be parallel, such as in a television screen or a face shield of a protective helmet. Common lens forming materials include CR-39 (diethyleneglycol bisallyl carbonate), bisphenol A polycarbonate (PC), and poly(methylmethacrylate) (PMMA). These lens forming materials are lighter and more shatter resistant than traditional glass and offer excellent transparency and low haze. Despite the above noted benefits, some serious drawbacks to transparent materials include being hydrophilic and oleophilic, as well as their susceptibility to scratching and/or abrasion.

Transparent materials can accumulate water and/or oil and interfere with the transparency of the material. For example, transparent materials can become fogged when tiny water droplets condense on the surface and cause light to scatter, rendering the surface translucent. Fogging typically occurs when a cold surface suddenly comes in contact with warm, moist air. In some cases, fogging can be a dangerous condition, for example, when the fogged material is an ophthalmic lens affecting a user's vision. Further, oil accumulation, for example, from a user, can interfere with the transparency. Additionally, some transparent materials such as transparent polymeric materials are much softer than glass and can be easily scratched under normal actions such as cleaning, wiping off dust, and normal handling while in use. Over time, scratches and abrasions on the surface can also obscure the user's vision. Consequently, such transparent polymeric surfaces are often treated with one or more coatings to provide omniphobic properties (i.e., having both hydrophobic and oleophobic properties), and scratch and/or abrasion resistance.

In this regard, much research has been devoted to providing coatings for transparent materials to improve their omniphobic performance, and scratch and/or abrasion resistance. However, while current coatings can provide some water-repelling or oil-repelling properties, the current coatings lack in providing both water-repelling and oil-repelling properties.

SUMMARY

A method for forming a coating can include preparing a nanocomposite film including surface modified silicon dioxide nanoparticles, applying an oxygen plasma treatment to the nanocomposite film to form a treated nanocomposite film, and applying a fluorosilane solution to the nanocomposite film to form a coating.

A coating can include a nanocomposite film including surface modified silicon dioxide nanoparticles, the nanocomposite film having an oxygen plasma treated surface, and a monolayer of a fluoro alkyl chain.

DETAILED DESCRIPTION OF THE DRAWINGS

The embodiments of the present application will be described, by way of example only, by reference to FIGS. 1-3 of the accompanying drawings in which:

FIG. 1 illustrates a cross-section of the coating.
FIG. 2 illustrates a substrate having the coating.
FIG. 3 illustrates a method for forming a coating.

DETAILED DESCRIPTION

The following Detailed Description is merely exemplary in nature and is not intended to limit the subject matter or the application and uses of the subject matter. Furthermore, there is no intention to be bound by any theory presented in the preceding background or the following detailed description.

In an embodiment, an improved coating system for transparent materials, such as ophthalmic lenses, mobile phones, information displays, automobiles, kitchen appliances, and medical instruments, and among others, is provided. The coating can provide improved characteristics in the form of hydrophobic and oleophobic performance and scratch or abrasion resistance, while also providing improved manufacturability as compared to prior art coating systems. Generally, the coating system described herein is a composite coating including surface modified silicone dioxide nanoparticles that have been cured to form a nanocomposite film. An oxygen plasma treatment is applied to the surface of the nanocomposite film and a fluorosilane solution is applied to the surface of the treated nanocomposite film. The coatings of the present disclosure can provide durable omniphobic coatings that can have improved abrasion resistance, as compared to previous approaches, pass the standards for the anti-fingerprint test, and can have easy cleanability.

Accordingly, some embodiments can provide one or more features or benefits such as coatings that impart long-lasting omniphobic properties, methods for forming the coatings, and coated transparent materials with long-lasting omniphobic properties. Furthermore, other features and characteristics of the present embodiments will become apparent from the subsequent detailed description and the appended claims, taken in conjunction with the accompanying drawings and this background.

Previous approaches can include using either a fluoropolymer or siloxane compound to react with the surfaces to get a lower surface energy coating. However, the solutions used do not allow for both hydrophobic and oleophobic properties in the same coating. Further, various techniques have been developed to fabricate artificial nonwetting surfaces, such as self-assembly, 3D diffuser lithography, wet chemical etching, however, these techniques are difficult for mass production and also do not provide good transparency performance for the coatings.

As discussed herein, the coating of the present disclosure has improved manufacturability, while providing a durable transparent omniphobic coating with improved abrasion and resistance properties.

FIG. 1 illustrates a cross-section of the coating 100. The coating 100 can include a nanocomposite film 102 having an oxygen plasma treated surface 106, and a monolayer of a fluoro alkyl chain 104. The nanocomposite film 102 can include silicon dioxide particles whose surface has been modified. The surface-modified silicon dioxide nanoparticles can be homogenously dispersed within an acrylate polymer and cured to form the nanocomposite file 102. The surface 106 of the nanocomposite film 102 can be roughened and treated with a fluorosilane solution to provide the monolayer of the fluoro alkyl chain 104.

As discussed herein, increasing the surface roughness can increase the omniphobic properties of the coating. For example, by increasing the roughness, the liquid doesn't enter the pockets formed of the roughened surface and can increase the contact angle and increase the omniphobic properties. The surface roughness of the coating can be controlled by varying the weight ratios of different sized silicon dioxide nanoparticles. In an embodiment, the silicon dioxide nanoparticles can include about 50 weight percent to about 80 weight percent of silicon dioxide nanoparticles having a particle diameter within a range of about 20 nanometers to about 40 nanometers and about 10 weight percent to about 50 weight percent of silicon dioxide nanoparticles having a particle diameter within a range of about 70 nanometers to about 100 nanometers. In an example, about 70 weight percent of the silicon dioxide nanoparticles have a particle diameter within a range of about 20 nanometers to about 40 nanometers and about 30 weight percent of the silicon dioxide nanoparticles have a particle diameter within a range of about 70 nanometers to about 100 nanometers.

As discussed herein, the surface of the silicon dioxide particles can be modified with a silane coupling agent. The surface of the silicon dioxide particles can be modified by combining the silicon dioxide nanoparticles and the silane coupling agent. Various silane coupling agents can be used. In one embodiment, the silane coupling agent can be 3-(Trimethoxysilyl) propyl methacrylate. However, others can be used.

The surface-modified silicon dioxide nanoparticles can include about 75 weight percent to about 90 weight percent of the silicon dioxide nanoparticles and about 10 weight percent to about 25 weight percent of the silane coupling agent surface modifier.

The surface-modified silicone dioxide nanoparticles can be combined with an acrylate polymer to form a resin. In an embodiment, the acrylate polymer can be selected from methyl methacrylate, hydroxyethyl methacrylate, poly(ethylene glycol) methacrylate, poly(ethylene glycol) diacrylate, and trimethylol propane triacrylate, among others. In one embodiment, the acrylate polymer is methyl methacrylate. As discussed herein, the silane coupling agent can act as a linker between the silicon dioxide nanoparticles and the acrylate polymer. The silane coupling agent can allow the silicon dioxide nanoparticle to disperse into the acrylate polymer homogeneously. Dispersing the surface-modified silicone dioxide nanoparticles homogenously within the acrylate polymer improves the optical transparency of the coating.

The resin can include about 10 weight percent to about 90 weight percent of the surface-modified nanoparticles and about 90 weight percent to about 10 weight percent of the acrylate polymer. In one embodiment, the resin can include 50 weight percent of the surface-modified nanoparticles and about 50 weight percent of the acrylate polymer.

As discussed herein, the resin can be cured using ultraviolet curing to form the nanocomposite film. The surface 106 of the nanocomposite film 102 can be roughened. For example, the surface 106 can be roughened via an oxygen plasma treatment. The oxygen plasma treatment is an etching method to get the micro- and/or nano-structure rough surface.

In an embodiment, the coating 100 can include a monolayer of a fluoro alkyl chain 104. In an embodiment, a length of the fluoro alkyl chain can be greater than 6. In one embodiment, the length of the fluoro alkyl chain can be about 10.

Figure 2:
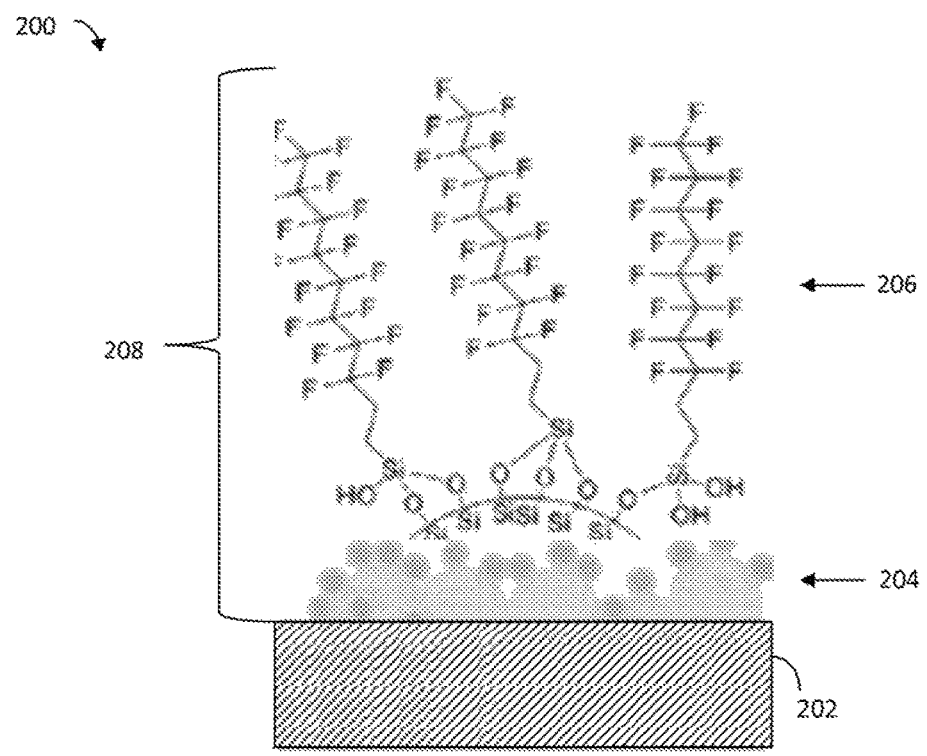

FIG. 2 illustrates a composite including a substrate 202 having the coating 208. The coating 208 can include a nanocomposite film 204 having an oxygen plasma treated surface and the monolayer of a fluoro alkyl chain 206. In an example, a thickness of the cured resin can be from about 0.5 micrometers to about 20 micrometers, and preferably from about 1 micrometer to about 10 micrometers.

Figure 3:
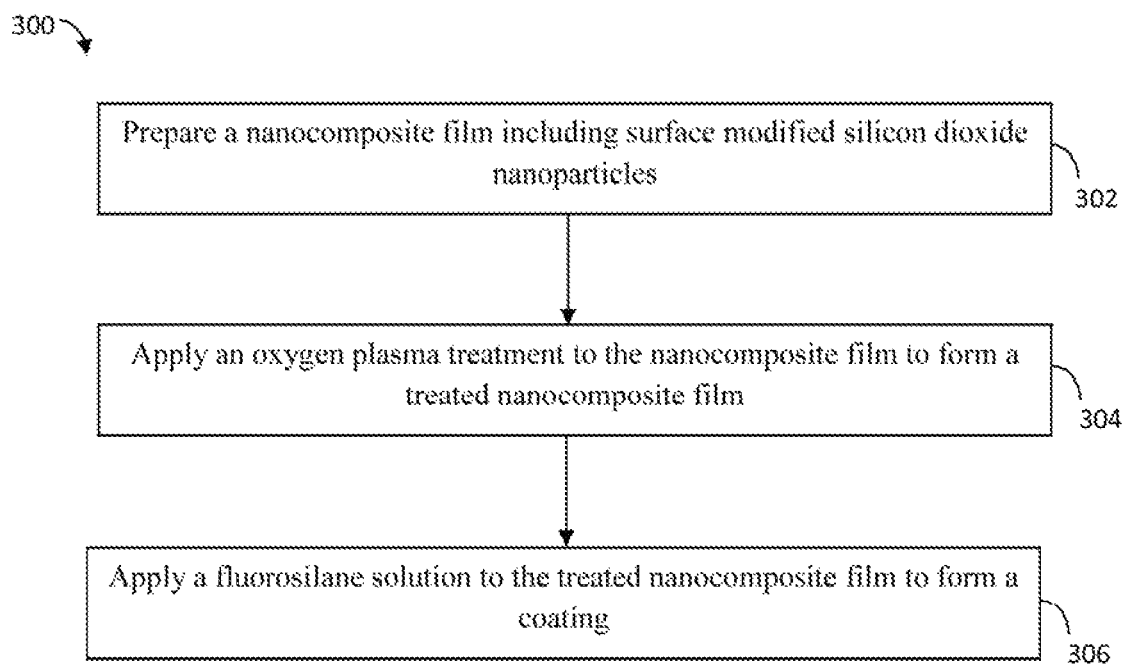

FIG. 3 illustrates a method 300 for forming a coating. The method 300 includes, at step 302, preparing a nanocomposite film including surface modified silicon dioxide nanoparticles, at step 304, applying an oxygen plasma treatment to the nanocomposite film to form a treated nanocomposite film, and at step 306, applying a fluorosilane solution to the nanocomposite film to form a coating. Surface roughness and surface energy can determine the liquid repellent property of the surface of the coating to reach omniphobic properties. The method for producing the coating combines a nanotexture rough surface with low surface tension to simultaneously exhibit hydrophobic and oleophobic properties. For example, the nanocomposite film is transparent and treated by oxygen plasma to provide a nanotexture rough surface. The exposed nanotexture rough surface is reacted with a fluorosilane solution to obtain a low surface tension surface. The combination of the surface roughness with the low surface tension provides the omniphobic coating, which passes the optical performance test, abrasion test, anti-fingerprint test, and easy cleanability test, while being easy to manufacture.

The method 300 can include modifying a surface of silicon dioxide nanoparticles. For example, a surface of the silicon dioxide nanoparticles can be modified by combining the silicon dioxide nanoparticles with the silane coupling agent. As discussed herein, in one embodiment the silane coupling agent can be 3-(Trimethoxysilyl) propyl methacrylate; however, other silane coupling agents can be used. Once the surface of the silicon dioxide nanoparticles have been modified, the method 300 can include combining the surface-modified silicon dioxide nanoparticles with an acrylate polymer to form a resin. For example, the surface-modified silicon dioxide particles are homogeneously dispersed in an acrylate polymer. The silane coupling agent can act as a linker between the silicon dioxide nanoparticles and the acrylate polymer, which allows the silicon dioxide nanoparticle to disperse into the acrylate polymer homogeneously. Dispersing the surface-modified silicone dioxide nanoparticles homogenously within the acrylate polymer improves the optical transparency of the coating.

In an embodiment, the acrylate polymer can be selected from one of from methyl methacrylate, hydroxyethyl methacrylate, poly(ethylene glycol) methacrylate, poly(ethylene glycol) diacrylate, and trimethylol propane triacrylate, among others. In one embodiment, the acrylate polymer is methyl methacrylate.

Once the surface-modified silicon dioxide nanoparticles are homogenously dispersed within the acrylate polymer forming the resin, the method 300 can include depositing the resin onto a substrate. For example, the substrate can be selected from one of CR-39 (diethyleneglycol bisallyl carbonate), bisphenol A polycarbonate (PC), and poly(methylmethacrylate) (PMMA), and glass, among others. The method 300 can further include curing the deposited resin to form the nanocomposite film. For example, the deposited resin can be cured using ultraviolet curing including a photoinitiator.

An example of photoinitiators include benzophenone (e.g., benzophenone, alkyl-substituted benzophenone, or alkoxy-substituted benzophenone); benzoin (e.g., benzoin, benzoin ethers, such as benzoin methyl ether, benzoin ethyl ether, and benzoin isopropyl ether, benzoin phenyl ether, and benzoin acetate); acetophenone, such as acetophenone, 2,2-dimethoxyacetophenone, 4-(phenylthio)acetophenone, and 1,1-dichloroacetophenone; benzil ketal, such as benzyl dimethyl ketal, and benzil diethyl ketal; anthraquinone, such as 2-methylanthraquinone, 2-ethylanthraquinone, 2-tertbutylanthraquinone, 1-chloroanthraquinone, and 2-amylanthraquinone; triphenylphosphine; benzoylphosphine oxides, such as, for example, 2,4,6-trimethylbenzoyldiphenylphosphine oxide; thioxanthone or xanthone; acridine derivative; phenazene derivative; quinoxaline derivative; 1-phenyl-1,2-propanedione-2-O-benzoyloxime; 1-aminophenyl ketone or 1-hydroxyphenyl ketone, such as 1-hydroxycyclohexyl phenyl ketone, phenyl(1-hydroxyisopropyl)ketone and 4-isopropylphenyl(1-hydroxyisopropyl)ketone; or a triazine compound, for example, 4'''-methyl thiophenyl-1-di(trichloromethyl)-3,5-S-triazine, S-triazine-2-(stilbene)-4,6-bis-trichloromethyl, or paramethoxy styryl triazine.

An example of a photoinitiator includes benzoin or its derivative such as α-methylbenzoin; U-phenylbenzoin; α-allylbenzoin; α-benzylbenzoin; benzoin ethers such as benzil dimethyl ketal (available, for example, under the trade designation "IRGACURE 651" from Ciba Specialty Chemicals), benzoin methyl ether, benzoin ethyl ether, benzoin n-butyl ether; acetophenone or its derivative, such as 2-hydroxy-2-methyl-1-phenyl-1-propanone (available, for example, under the trade designation "DAROCUR 1173" from Ciba Specialty Chemicals) and 1-hydroxycyclohexyl phenyl ketone (available, for example, under the trade designation "IRGACURE 184" from Ciba Specialty Chemicals); 2-methyl-1-[4-(methylthio) phenyl]-2-(4-morpholinyl)-1-propanone (available, for example, under the trade designation "IRGACURE 907" from Ciba Specialty Chemicals); 2-benzyl-2-(dimethlamino)-1[4-(4-morpholinyl) phenyl]-1-butanone (available, for example, under the trade designation "IRGACURE 369" from Ciba Specialty Chemicals); or a blend thereof.

Another useful photoinitiator includes pivaloin ethyl ether, anisoin ethyl ether; anthraquinones, such as anthraquinone, 2-ethylanthraquinone, 1-chloroanthraquinone, 1,4-dimethylanthraquinone, 1-methoxyanthraquinone, benzanthraquinonehalomethyltriazines, and the like; benzophenone or its derivative; iodonium salt or sulfonium salt as described hereinabove; a titanium complex such as bis(5-2, 4-cyclopentadienyl)bis[2,-6-difluoro-3-(1H-pyrrolyl)phenyl)titanium (commercially available under the trade designation "CG1784DC", also from Ciba Specialty Chemicals); a halomethylnitrobenzene such as 4-bromomethylnitrobenzene and the like; or mono- or bis-acylphosphine (available, for example, from Ciba Specialty Chemicals under the trade designations "IRGACURE 1700", "IRGACURE 1800", "IRGACURE 1850", and "DAROCUR 4265"). A suitable photoinitiator may include a blend of the above mentioned species, such as α-hydroxy ketone/acrylphosphin oxide blend (available, for example, under the trade designation IRGACURE 2022 from Ciba Specialty Chemicals).

A photoinitiator can be present in an amount not greater than about 20 weight percent for example, not greater than about 10 weight percent and typically not greater than about 5 weight percent, based on the total weight of the resin. For example, a photoinitiator may be present in an amount of 0.1 weight percent to 20.0 weight percent, such as 0.1 weight percent to 5.0 weight percent, or most typically 0.1 weight percent to 2.0 weight percent, based on the total weight of the resin, although amounts outside of these ranges may also be useful. In one example, the photoinitiator is present in an amount at least about 0.1 weight percent, such as at least about 1.0 weight percent, for example in an amount 1.0 weight percent to 10.0 weight percent.

As discussed herein, the method 300, at step 304, includes applying an oxygen plasma treatment to the nanocomposite film to form a treated nanocomposite film. The oxygen plasma treatment can roughen the surface and expose the silicone dioxide nanoparticles.

The method 300, at step 306, includes applying a fluorosilane solution to the nanocomposite film. Applying the fluorosilane solution to the treated nanocomposite film forms a monolayer of a fluoro alkyl chain on the roughened surface of the treated nanocomposite film. The fluorosilane solution can include a fluorosilane selected from perfluoro-Longlenth-Alkyl-Trimethoxysilanes, such as perfluorooctyl trimethoxysilane and perfluorodecyl trimethoxysilane. For example, the perfluorooctyl trimethoxysilane has the following chemical structure:

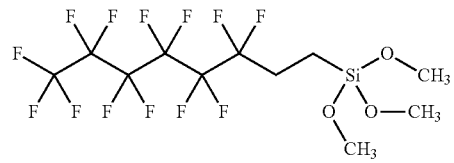 [SMILES: CO[Si](CCC(F)(F)C(F)(F)C(F)(F)C(F)(F)C(F)(F)C(F)(F)F)(OC)OC]

and perfluorodecyl trimethoxysilane has the following chemical structure:

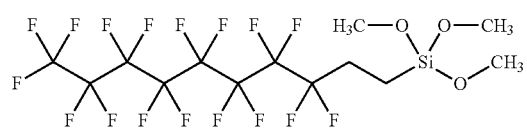

The fluorosilane solution can have about 2 weight percent of the fluorosilane. The fluorosilane solution can include ethanol (3 weight percent) that has a pH within the range of 2.8-3.0. Applying the fluorosilane solution can include at least one of dip-coating, spin-coating, spray-coating, and doctor blade.

Forming the monolayer of the fluoro alkyl chain can lower the surface energy of the surface. The monolayer of the fluoro alkyl chain can be formed on the surface of the treated nanocomposite by the hydrolysis of SiO—CH3 and then the condensation between hydrolyzed fluorosilane and the Si—OH of silica. The pH of the fluorosilane solution can influence the hydrolyze of the fluorosilane. The method 300 disclosed herein can provide easy manufacturability and provide a coating that exhibits omniphobic properties while providing improved abrasion resistance.

The coating may also include other components such as solvents, plasticizers, crosslinkers, chain transfer agents, stabilizers, surfactants, curing agents, reaction mediators and agents for influencing the fluidity of the dispersion. For example, the coating can also include one or more chain transfer agents selected from the group consisting of polyol, polyamine, linear or branched polyglycol ether, polyester and polylactone.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in this document, the terms "first," "second," and "third," etc. are used merely as labels, and are not intended to impose numerical requirements on their objects.

From the foregoing, it will be observed that numerous variations and modifications can be effected without departing from the spirit and scope of the subject matter. It is to be understood that no limitation with respect to the specific apparatus illustrated herein is intended or should be inferred. It is, of course, intended to cover by the appended claims all such modifications as fall within the scope of the claims.

Although a few embodiments have been described in detail above, other modifications are possible. For example, the logic flows depicted in the FIGS. do not require the particular order shown, or sequential order, to achieve desirable results. Other steps can be provided, or steps can be eliminated, from the described flows, and other components can be added to, or removed from, the described systems. Other embodiments can be within the scope of the following claims.

EXAMPLES

Example 1—Forming the Coating

A solution was formed by modifying the surface of silicon dioxide nanoparticles by combining 3-(Trimethoxysilyl)propyl methacrylate (5 grams) with silicon dioxide nanoparticles (30 grams) and mixing the solution and stirring for 12 hrs. The surface modified silicon dioxide nanoparticles (35 grams) were added to methyl methacrylate (35 grams) to form a resin. The resin was UV cured (High-powered Fusion UV system (120 W/cm2)) using the photoinitiator having a commercial name IRG184 to form the nanocomposite film. An oxygen plasma treatment was applied to the surface of the nanocomposite film to form a treated nanocomposite film. The nanocomposite film was placed in the chamber of the plasma cleaner, treated by oxygen plasma for 10 minutes 70 Watts power to form the treated nanocomposite film. A fluorosilane solution was applied to the treated nanocomposite film. The fluorosilane solution was formed by adjusting the pH of a 3 weight percent ethanol solution to 2.8. The fluorosilane (Decyl)-trimethoxysilane was added into the ethanol solution to form a 2 weight percent solution of the fluorosilane.

The coating formed in Example 1, was tested for optical performance, abrasion, cleanability, and contact angle of water and oil.

Optical Performance

The coating from Example 1 was tested for optical performance. The visible light transmittance was measured by an UV-vis spectrometer. The coating in Example 1 was casted on a glass substrate and tested. The coating from Example 1 tested very clear and had a transmittance greater than 90%.

Abrasion Test

The coating in Example 1 was tested for scratch hardness using the pencil method (the International Organization for Standardization test method 15184). The coating of Example 1 had a hardness of 4.

The adhesiveness of the coating in Example 1 was also tested using the cross-cut test (ISO 2409). The coating in Example 1 has a result of 100/100.

Cleanability Test

The cleanability of the coating in Example 1 was performed by remarking the surface with a mark pen following with a wipe for greater than 100 times. No residue was left on the coating surface.

Contact Angle Test

The contact angle for water and oil were measured for the coating formed in Example 1. The water and oil contact angles of the coating from Example 1 were determined by a contact angle analyzer. Distilled water and n-1-octadecene (surface tension is 27.6 mN/m) were used for the water and oil contact angle measurement, respectively. The needle was 0.4 mm diameter.

The contact angle with a water drop was: 133±5 degrees. The contact angle with an oil drop was: 105±5 degrees.

Additional Notes & Examples

Examples of the present disclosure provide coatings and methods for forming the coatings that have omniphobic properties.

In Example 1, a method for forming a coating includes preparing a nanocomposite film including surface modified silicon dioxide nanoparticles, applying an oxygen plasma treatment to the nanocomposite film to form a treated nanocomposite film, and applying a fluorosilane solution to the treated nanocomposite film to form a coating.

In Example 2, Example 1 can be optionally configured such that preparing the nanocomposite film includes modifying a surface of silicon dioxide nanoparticles.

In Example 3, Example 2 can be optionally configured such that modifying the surface of silicon dioxide nanoparticles includes combining the silicon dioxide nanoparticles and a silane coupling agent to form the surface modified silicon dioxide nanoparticles.

In Example 4, Examples 1 through 3 can be optionally configured such that about 50 weight percent to about 80 weight percent of the silicon dioxide nanoparticles have a particle diameter within a range of about 20 nanometers to about 40 nanometers.

In Example 5, Example 4 can be optionally configured such that about 10 weight percent to about 50 weight percent of the silicon dioxide nanoparticles have a particle diameter within a range of about 70 nanometers to about 100 nanometers.

In Example 6, Examples 1 through 5 can be optionally configured such that about 70 weight percent of the silicon dioxide nanoparticles have a particle diameter within a range of about 20 nanometers to about 40 nanometers and wherein about 30 weight percent of the silicon dioxide nanoparticles have a particle diameter within a range of about 70 nanometers to about 100 nanometers.

In Example 7, Examples 1 through 6 can be optionally configured such that preparing the nanocomposite film includes dispersing the surface modified silicon dioxide nanoparticles into an acrylate polymer to form a resin.

In Example 8, Example 7 can be optionally configured such that the acrylate polymer is selected from one of: methyl methacrylate, hydroxyethyl methacrylate, poly(ethylene glycol) methacrylate, poly(ethylene glycol) diacrylate, and trimethylol propane triacrylate.

In Example 9, Examples 1 through 8 can be optionally configured such that preparing the nanocomposite film, includes depositing the resin onto a substrate, and curing the deposited resin to form the nanocomposite film.

In Example 10, Example 9 can be optionally configured such that curing the applied resin includes using ultraviolet curing with a photoinitiator.

In Example 11, Examples 1 through 10 can be optionally configured such that applying the fluorosilane solution includes at least one of dip-coating, spin-coating, spray-coating, and doctor blade.

In Example 12, Examples 1 through 11 can be optionally configured such that the fluorosilane solution includes at least one of perfluorooctyl trimethoxysilane and perfluorodecyl trimethoxysilane.

In Example 13, a coating includes a nanocomposite film including surface modified silicon dioxide nanoparticles, the nanocomposite film having an oxygen plasma treated surface; and a monolayer of a fluoro alkyl chain.

In Example 14, Example 13 can be optionally configured to include an acrylate polymer, a silane coupling agent, and a photoinitiator.

In Example 15, Examples 13 or 14 can be optionally configured such that wherein about 50 weight percent to about 80 weight percent of the silicon dioxide nanoparticles have a particle diameter within a range of about 20 nanometers to about 40 nanometers and about 10 weight percent to about 50 weight percent of the silicon dioxide nanoparticles have a particle diameter within a range of about 70 nanometers to about 100 nanometers.

In Example 16, the method or coatings of any one or any combination of Examples 1-15 can optionally be configured such that all elements or options recited are available to use or select from.

These non-limiting examples can be combined in any permutation or combination. The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In the application, the terms "including" and "in which" are used as the plain-English equivalents of the respective terms "comprising" and "wherein." Also, in the following claims, the terms "including" and "comprising" are open-ended, that is, a method, a battery, or an energy device that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" should be interpreted to include not just 0.1% to 5%, inclusive, but also the individual values (e.g., 1%, 2%, 3%, and 4%) and the sub-ranges (e.g., 0.1% to 0.5%, 1.1% to 2.2%, 3.3% to 4.4%) within the indicated range. As used herein, the term "about" can be defined to include a margin of error, for example, at least +/−10%.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:
1. An omniphobic coating, comprising:
   a cured nanocomposite film including surface-modified silicon dioxide nanoparticles, the cured nanocomposite film having an oxygen plasma treated surface; and
   a monolayer of a fluoro alkyl chain on the oxygen plasma treated surface of the cured nanocomposite film, wherein the omniphobic coating has a contact angle to water of 128 to 138 degrees and a contact angle to oil of 100 to 110 degrees.

2. The coating of claim 1, wherein the cured nanocomposite film including surface-modified silicon dioxide nanoparticles is prepared from a curable composition comprising an acrylate monomer, silicon dioxide nanoparticles, a silane coupling agent, and a photoinitiator.

3. The coating of claim 2, wherein 50 weight percent to 80 weight percent of the silicon dioxide nanoparticles have a particle diameter within a range of 20 nanometers to 40 nanometers and 10 weight percent to 50 weight percent of the silicon dioxide nanoparticles have a particle diameter within a range of 70 nanometers to 100 nanometers.

* * * * *